(12) United States Patent
Ouellette et al.

(10) Patent No.: US 8,188,765 B2
(45) Date of Patent: May 29, 2012

(54) CIRCUIT AND METHOD FOR ASYNCHRONOUS PIPELINE PROCESSING WITH VARIABLE REQUEST SIGNAL DELAY

(75) Inventors: Michael R. Ouellette, Westford, VT (US); Faraydon Pakbaz, Milton, VT (US); Jack R. Smith, South Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/882,425

(22) Filed: Sep. 15, 2010

(65) Prior Publication Data

US 2012/0062300 A1   Mar. 15, 2012

(51) Int. Cl.
*H03K 19/00* (2006.01)
*H03K 19/096* (2006.01)
*H03K 19/094* (2006.01)
*H03K 19/20* (2006.01)

(52) U.S. Cl. ............................ 326/93; 326/95; 326/112
(58) Field of Classification Search .................... 326/93, 326/95; 713/503
See application file for complete search history.

(56) References Cited

U.S. PATENT DOCUMENTS

| | | | |
|---|---|---|---|
| 5,920,899 A * | 7/1999 | Chu | 711/169 |
| 6,140,836 A | 10/2000 | Fujii et al. | |
| 6,590,424 B2 * | 7/2003 | Singh et al. | 326/93 |
| 6,598,627 B2 | 7/2003 | Manzari et al. | |
| 6,700,410 B2 * | 3/2004 | Ebergen | 326/93 |
| 6,958,627 B2 * | 10/2005 | Singh et al. | 326/93 |
| 7,053,665 B2 * | 5/2006 | Singh et al. | 326/121 |
| 7,948,265 B1 * | 5/2011 | Young et al. | 326/38 |
| 2002/0069347 A1 * | 6/2002 | Singh et al. | 712/216 |
| 2004/0046590 A1 | 3/2004 | Singh et al. | |
| 2007/0271449 A1 * | 11/2007 | Lichtensteiger et al. | 712/244 |

* cited by examiner

*Primary Examiner* — Shawki S Ismail
*Assistant Examiner* — Dylan White
(74) *Attorney, Agent, or Firm* — Gibb I.P. Law Firm, LLC; David A. Cain, Esq.

(57) ABSTRACT

Disclosed are embodiments of an asynchronous pipeline circuit. In each stage of the circuit, a variable delay line is incorporated into the request signal path. A tap encoder monitors data entering the stage to detect any state changes occurring in specific data bits. Based on the results of this monitoring (i.e., based on which of the specific data bits, if any, exhibit state changes), the tap encoder enables a specific tap in the variable delay line and, thereby, automatically adjusts the delay of a request signal transmitted along the request signal path. Using a variable request signal delay allows data from a transmitting stage to be captured by a receiving stage prior to the expiration of the maximum possible processing time associated with the transmitting stage, thereby minimizing overall processing time. Also disclosed are embodiments of methods for asynchronous pipeline processing with variable request signal delay and for incorporating variable request signal delay into an asynchronous pipeline circuit design.

20 Claims, 7 Drawing Sheets

CIRCUIT AND METHOD FOR ASYNCHRONOUS PIPELINE PROCESSING WITH VARIABLE REQUEST SIGNAL DELAY

BACKGROUND

1. Field of the Invention

The embodiments relate to asynchronous pipeline processing. More particularly, the embodiments relate to an asynchronous pipeline circuit with variable request signal delay, a method for asynchronous pipeline processing with variable request signal delay and a method for incorporating variable request signal delay into an asynchronous pipeline circuit design.

2. Description of the Related Art

In data processing, a pipeline typically refers to an integrated circuit having multiple stages of logic blocks (i.e., multiple stages of combinational logic) that are connected in series so that the output of one stage (i.e., data-out) is the input of the next stage (i.e., data-in). A synchronous pipeline refers to a pipeline in which registers are inserted between the various stages and synchronously clocked to ensure that any data being transferred between stages is stable. That is, between each of the stages in a synchronous pipeline, a register is clocked so that the data-in to the logic block of a receiving stage is the final data-out from the logic block of the transmitting stage. An asynchronous pipeline refers to a pipeline that uses a handshaking protocol, rather clocked registers, to pass data from one stage to the next stage. That is, a transmitting stage performs its logic function (i.e., propagates data through its logic block) and also asserts a request signal to indicate to a receiving stage (i.e., the next stage in the pipeline) that new data is available for capture. Then, upon receipt of the request signal, the receiving stage captures this new data and asserts an acknowledge signal back to the transmitting stage to acknowledging receipt.

Asynchronous pipelines avoid issues related to clocking (e.g., additional power requirements, management of clock skew, interfacing with environments clocked at different rates, etc.). However, for the handshaking protocol to work properly, the path traveled by the request signal (i.e., the request signal path) must be carefully timed so that the request signal arrives at the receiving stage only after the data processed by the logic block in the transmitting stage is stable (i.e., only after data propagation through the logic block in the transmitting stage is complete). Traditionally, the timing requirements of the request signal are met by inserting a buffer into the request signal path. Such a buffer ensures that a fixed request signal delay, which is greater than or equal to the maximum possible processing time that could be required for propagation of data through the logic block of the transmitting stage. Oftentimes, however, a logic block within a given stage of the asynchronous pipeline circuit will have completed data processing prior to the expiration of the fixed request signal delay for that stage. As a result, the stage must sit idle waiting for the request signal delay to expire. Therefore, it would be advantageous to provide an improved asynchronous pipeline circuit that minimizes the amount of time during which pipeline stages sit idle (e.g., waiting for a fixed request signal delay to expire) in order to decrease overall pipeline processing time.

SUMMARY

Disclosed herein are embodiments of an asynchronous pipeline circuit with variable request signal delay. This pipeline circuit can comprise multiple stages connected in series. Specifically, it can comprise at least a first stage and a second stage connected in series to the first stage. The first stage can process a first set of data bits in order to generate a second set of data bits. Additionally, the pipeline circuit can comprise a request signal path between the first and second stages. The request signal path can transmit a request signal from the first stage to the second stage as the first set of data bits is being processed by the first stage and, upon receipt of the request signal, the second stage can initiate processing of the second set of data bits, which were generated and output by the first stage. However, rather than having a fixed request signal delay equal to or greater than the maximum possible processing time associated with the first stage, the request signal path can incorporate a variable delay line that allows delay of the request signal along the request signal path to be automatically adjusted so that the transit time for the request signal along the request signal path approximates the actual processing time that will be required by the first stage to completely process the first set of data bits. For example, the automatic adjustment of the delay of the request signal can be dependent upon state change(s) or the lack thereof detected in specific data bits in the first set, where such state changes are known to be indicative of the relative processing time that will be required by the first stage to completely process the first set of data bits.

Also disclosed herein are embodiments of an associated method for asynchronous pipeline processing with variable request signal delay. The method can comprise initiating processing of a first set of data bits by a first stage of an asynchronous pipeline circuit in order to generate a second set of data bits. Transmission of a request signal along a request signal path from the first stage to a second stage of the asynchronous pipeline circuit can be initiated essentially simultaneously. However, rather than having a fixed request signal delay equal to or greater than the maximum possible processing time associated with the first stage, the delay of the request signal along a variable delay line incorporated into the request signal path can be automatically adjusted so that the transit time for the request signal along the request signal path approximates the actual processing time that will be required by the first stage to completely process the first set of data bits. For example, the automatic adjustment of the delay of the request signal can be dependent upon state change(s) or the lack thereof detected in specific data bits in the first set, where such state changes are known to be indicative of the relative processing time that will be required by the first stage to completely process the first set of data bits. Once the request signal is received by the second stage, the second stage can initiate processing of the second set of data bits in order to generate a third set of data bits.

Also disclosed herein are embodiments of an associated method for incorporating variable request signal delay into an asynchronous pipeline circuit design. The method can comprise providing a design for a pipeline circuit having multiple stages connected in series. Specifically, in this design, the circuit can comprise at least a first stage and a second stage connected in series to the first stage. The first stage can be configured to process a first set of data bits in order to generate a second set of data bits and the second stage can be configured to receive and process the second sets of data bits. Next, a handshaking protocol can be established between the first stage and the second stage. Specifically, to establish the handshaking protocol, the data bits in the first set can be sorted into different groups according to the relative processing times that will be required for propagation of those data bits through the logic block within the first stage. Then, the different maximum processing times for the different groups can be determined. Next, based on the different maximum processing times, the different minimum request signal delays required for the different groups can be determined. Finally, a request signal path can be incorporated between the first stage and the second stage. This request signal path can comprise a variable delay line that allows the delay of a request signal transmitted along the request signal path from the first stage to the second stage to be automatically adjusted to any one of the different minimum request signal delays.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

Figure 1:
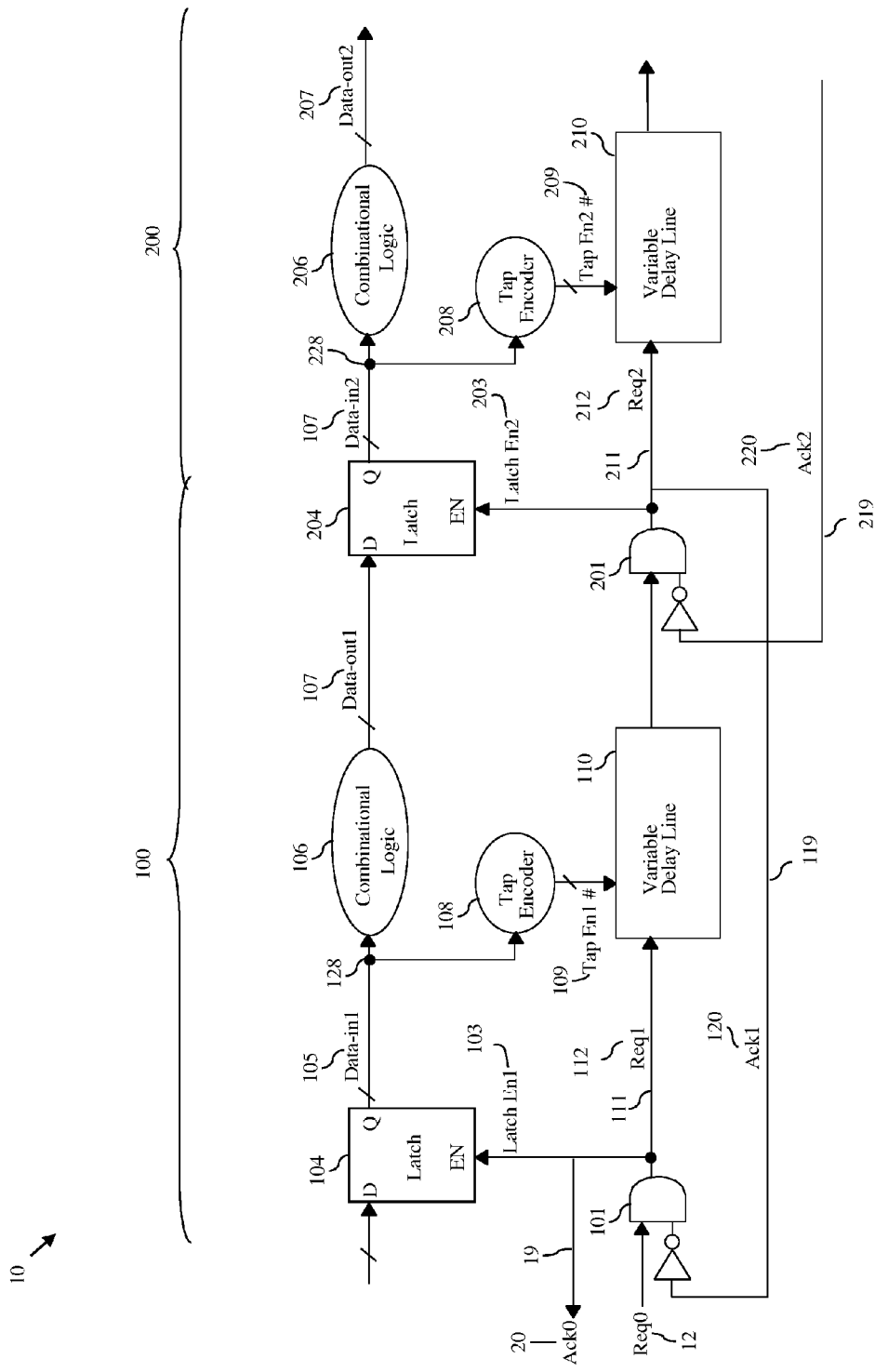
FIG. 1 is a schematic diagram illustrating an embodiment of an asynchronous pipeline circuit with variable request signal delay.

The embodiments of the invention and the various features and advantageous details thereof are explained more fully with reference to the non-limiting embodiments that are illustrated in the accompanying drawings and detailed in the following description.

As mentioned above, in data processing, a pipeline typically refers to an integrated circuit having multiple stages of logic blocks (i.e., multiple stages of combinational logic) that are connected in series so that the output of one stage (i.e., data-out) is the input of the next stage (i.e., data-in). A synchronous pipeline refers to a pipeline in which registers are inserted between the various stages and synchronously clocked to ensure that any data being transferred between stages is stable. That is, between each of the stages in a synchronous pipeline, a register is clocked so that the data-in to the logic block of a receiving stage is the final data-out from the logic block of the transmitting stage. An asynchronous pipeline refers to a pipeline that uses a handshaking protocol, rather clocked registers, to pass data from one stage to the next stage. That is, a transmitting stage performs its logic function (i.e., propagates data through its logic block) and also asserts a request signal to indicate to a receiving stage (i.e., the next stage in the pipeline) that new data is available for capture. Then, upon receipt of the request signal, the receiving stage captures this new data and asserts an acknowledge signal back to the transmitting stage to acknowledging receipt.

Asynchronous pipelines avoid issues related to clocking (e.g., additional power requirements, management of clock skew, interfacing with environments clocked at different rates, etc.). For this handshaking protocol to work properly, the path traveled by the request signal (i.e., the request signal path) must be carefully timed so that the request signal arrives at the receiving stage only after the data processed by the logic block in the transmitting stage is stable (i.e., only after data propagation through the logic block in the transmitting stage is complete). Traditionally, the timing requirements of the request signal are met by inserting a buffer into the request signal path. Such a buffer ensures that a fixed request signal delay, which is greater than or equal to the maximum possible processing time that could be required for propagation of data through the logic block of the transmitting stage. However, in any given stage, the actual processing time required for processing an incoming set of data bits will vary depending upon which of the data bits in the incoming set of data bits exhibit state changes. That is, due to the configuration of the logic block with the stage, each data bit that exhibits a state change may require propagation through a different number of levels of logic and/or through different sized devices within each level and, thereby may require a different amount of processing time. Thus, as a function of the specific data being processed, the logic block may complete processing prior to the expiration of the fixed request signal delay for the stage. As a result, the stage will simply sit idle waiting for the request signal delay to expire. Therefore, it would be advantageous to provide an improved asynchronous pipeline circuit that minimizes the amount of time during which pipeline stages sit idle (e.g., waiting for a fixed request signal delay to expire) in order to decrease overall pipeline processing time.

In view of the foregoing, disclosed herein are embodiments of an asynchronous pipeline circuit with variable request signal delay. Specifically, in each stage of the pipeline circuit, a variable delay line with a plurality of taps is incorporated into the request signal path. A tap encoder monitors data entering the stage to detect any state changes occurring in specific data bits. Based on the monitoring results (i.e., based on which of the specific data bits, if any exhibit state changes), the tap encoder enables a specific tap within the variable delay line and, thereby automatically adjusts the delay of a request signal transmitted along the request signal path. Using a variable request signal delay, as opposed to a fixed request signal delay, allows data from a transmitting stage to be captured by a receiving stage prior to the expiration of the maximum possible processing time associated with the logic block of the transmitting stage. Consequently, the disclosed asynchronous pipeline circuit minimizes the amount of time during which pipeline stages sit idle (e.g., waiting for a request signal delay to expire) and, thereby decreases overall pipeline processing time. Also disclosed are embodiments of methods for asynchronous pipeline processing with variable request signal delay and for incorporating variable request signal delay into an asynchronous pipeline circuit design.

Referring to FIG. 1, disclosed herein are embodiments of an asynchronous pipeline circuit 10 with variable request signal delay. This pipeline circuit 10 can comprise multiple stages, which are connected in series and which use a handshaking protocol, rather clocked registers, to pass data from one stage to the next stage.

The asynchronous pipeline circuit 10 can comprise at least a first stage 100 and a second stage 200 connected in series to the first stage 100. The first stage 100 can process (i.e., can be adapted to process, configured to process, etc.) a first set of data bits 105 (see Data-in1) in order to generate a second set of data bits 107 (see Data-out1). Using the handshaking protocol, the second stage 200 can receive the second set of data bits 107 from the first stage 100 (i.e., Data-out1=Data-in2) and process that second set of data bits 107 in order to generate a third set of data bits 207 (see Data-out2) and so on. It should be understood that the inventive variable request signal delay of the disclosed embodiments, discussed in detail below, can be implemented in any asynchronous pipeline circuit having two or more series connected stages.

In such an asynchronous pipeline circuit 10, the first stage 100 can comprise a first latch 104, a first logic block 106 (i.e., first combinational logic), a first controller 101, a first request signal path 111, and a first acknowledge signal path 119. The second stage 200 can similarly comprise a second latch 204, a second logic block 206 (i.e., second combinational logic), a second controller 201, a second request signal path 211, and a second acknowledge signal path 219.

In operation, the first latch 104 can receive and store (i.e., can be adapted to receive and store, configured to receive and store, etc.) a first set of data bits 105 from an initial data source. The first controller 101 can input (i.e., can be adapted to input, configured to input, etc.) a first enable signal 103 (see Latch En1) into the first latch 104 so that the first enable signal 103 causes the first latch 104 to output the first set of data bits 105 to the first logic block 106 for processing. The first logic block 106 can process (i.e., can be adapted to process, configured to process, etc.) the first set of data bits 105 in order to generate and output a second set of data bits 107 to the second latch 204 of the second stage 200. In addition to inputting the first enable signal 103 into the first latch 104, the first controller 106 can essentially simultaneously initiate transmission (i.e., can be adapted to essentially simultaneously initiate transmission, can be configured to essentially simultaneously initiate transmission, etc.) of a first request signal 112 (see Req1) along the first request signal path 111 towards the second stage 200 such that the request signal path 111 and first logic block 106 operate in parallel. Optionally, the first controller 101 can also essentially simultaneously initiate transmission of an initial acknowledge signal 20 along an initial acknowledge signal path 19 back to the source of the first set of data bits 105, indicating that the first set of data bits 105 was received.

For example, the first controller 101 can comprise a first logic gate. This first logic gate can receive an initial request signal 12 from the initial data source, indicating that the incoming first set of data bits 105 is stable and ready for processing. The first logic gate 101 can also receive a first acknowledge signal 120 from the second controller 201 of the second stage 200, indicating that a second set of data bits 107 previously output by the first stage 100 has been captured by the second stage 200 and that the first stage 100 can begin processing the incoming first set of data bits 105. Upon receipt of both the initial request signal 12 and the first acknowledge signal 120, the first logic gate 101 can output a signal that is split as the first enable signal 103 to the first latch 104, as the first request signal 112 to the first request signal path 111 and, optionally, as the initial acknowledge signal 20 to the initial acknowledge signal path 19.

Similarly, in operation, the second latch 204 can receive and store (i.e., can be adapted to receive and store, configured to receive and store, etc.) the second set of data bits 107 from the first logic block 106 of the first stage 100. The second controller 201 can input (i.e., can be adapted to input, configured to input, etc.) a second enable signal 203 (see Latch En2) into the second latch 204 so that the second enable signal 203 causes the second latch 204 to output the second set of data bits 107 to the second logic block 206 for processing. The second logic block 206 can process (i.e., can be adapted to process, configured to process, etc.) the second set of data bits 107 in order to generate and output a third set of data bits 207 to, for example, a third latch of a third stage (not shown). In addition to inputting the second enable signal 203 into the second latch 204, the second controller 206 can essentially simultaneously initiate transmission (i.e., can be adapted to essentially simultaneously initiate transmission, can be configured to essentially simultaneously initiate transmission, etc.) of a second request signal 212 (see Req2) along the second request signal path 211 towards a third stage (not shown). The second controller 101 can also essentially simultaneously initiate transmission of a first acknowledge signal 120 along a first acknowledge signal path 219 back to the source of the first set of data bits 105 (i.e., controller 101), indicating that the first set of data bits 105 was received.

For example, the second controller 201 can comprise a second logic gate. This second logic gate can receive the first request signal 112 from the first request signal path 111, indicating that the second set of data bits 107 as processed by the first logic block 106 is stable and ready for processing. The second logic gate 201 can also receive a second acknowledge signal 220 from a third controller of a third stage (not shown), indicating that a third set of data bits 207 previously output by the second stage 200 has been captured by the third stage and that the second stage 200 can begin processing the incoming second set of data bits 107. Upon receipt of both the first request signal 112 and the second acknowledge signal 220, the second logic gate 201 can output a signal that is split as the second enable signal 203 to the second latch 204, as the second request signal 212 to the second request signal path 211 and, optionally, as the first acknowledge signal 120 to the first acknowledge signal path 119 and back to the first controller 101.

As mentioned above, in any given stage, the actual processing time required for processing an incoming set of data bits will vary depending upon which of the data bits in the incoming set of data bits exhibit state changes. That is, due to the configuration of the logic block with the stage, each data bit that exhibits a state change may require propagation through a different number of levels of logic and/or through different sized devices within each level and, thereby may require a different amount of processing time. Thus, as a function of the specific data being processed, the logic block may complete processing prior to the expiration of a fixed request signal delay for the stage. As a result, the stage will simply sit idle waiting for the request signal delay to expire. Therefore, in order to minimize the amount of time during which pipeline stages sit idle and, thereby to decrease overall pipeline processing time, the request signal paths 111, 211 in the embodiments of the circuit 10 of the present invention incorporate variable delay lines 110, 210 that allow delay of the respective request signals 112, 222 to be automatically adjusted so that the transit times for those request signals approximate the actual processing times required by the respective stages 100, 200 to completely process incoming data.

More specifically, in the embodiments of the circuit 10, the first request signal path 111 can comprise a first variable delay line 110 that allows for (i.e., is configured to allow for, is adapted to allow for, etc.) automatic adjustment of the delay of the first request signal 112 depending upon state change(s) or the lack thereof detected in specific data bits in the first set 105, where such state changes are known to be indicative of the actual processing time that will be required by the first stage 100 and, particularly, the first logic block 106 to completely process the first set of data bits 105 into the second set of data bits 107. Automatic adjustment of the delay of the first request signal 112 is performed so that the transit time for the first request signal 112 along the first request signal path 111 from the first stage 100 to the second stage 200 and, particularly, from the first controller 101 to the second controller 201 approximates the actual processing time required by the first logic block 106 to completely process the first set of data bits 105. More particularly, this adjustment is performed so that the transit time of the first request signal 112 is as close as possible to, without being less than, the actual processing time required by the first logic block 106, given the available delay values in the variable delay line 110.

Similarly, the second request signal path 211 can comprise a second variable delay line 210 that allows for (i.e., is configured to allow for, is adapted to allow for, etc.) automatic adjustment of the delay of the second request signal 212 depending upon state change(s) or the lack thereof detected in specific data bits of the second set 107, where such state changes are known to be indicative of the actual processing time that will be required by the second stage 200 and, particularly, the second logic block 206 to completely process the second set of data bits 107 into the third set of data bits 107. Automatic adjustment of the delay of the second request signal 212 is performed so that the transit time for the second request signal 212 along the second request signal path 211 from the second stage 200 to the third stage approximates the actual processing time required by the second logic block 206 to completely process the second set of data bits 107. More particularly, this adjustment is performed so that the transit time of the second request signal 212 is as close as possible to, without being less than, the actual processing time, given the available delay values in the variable delay line 210.

Figure 2:
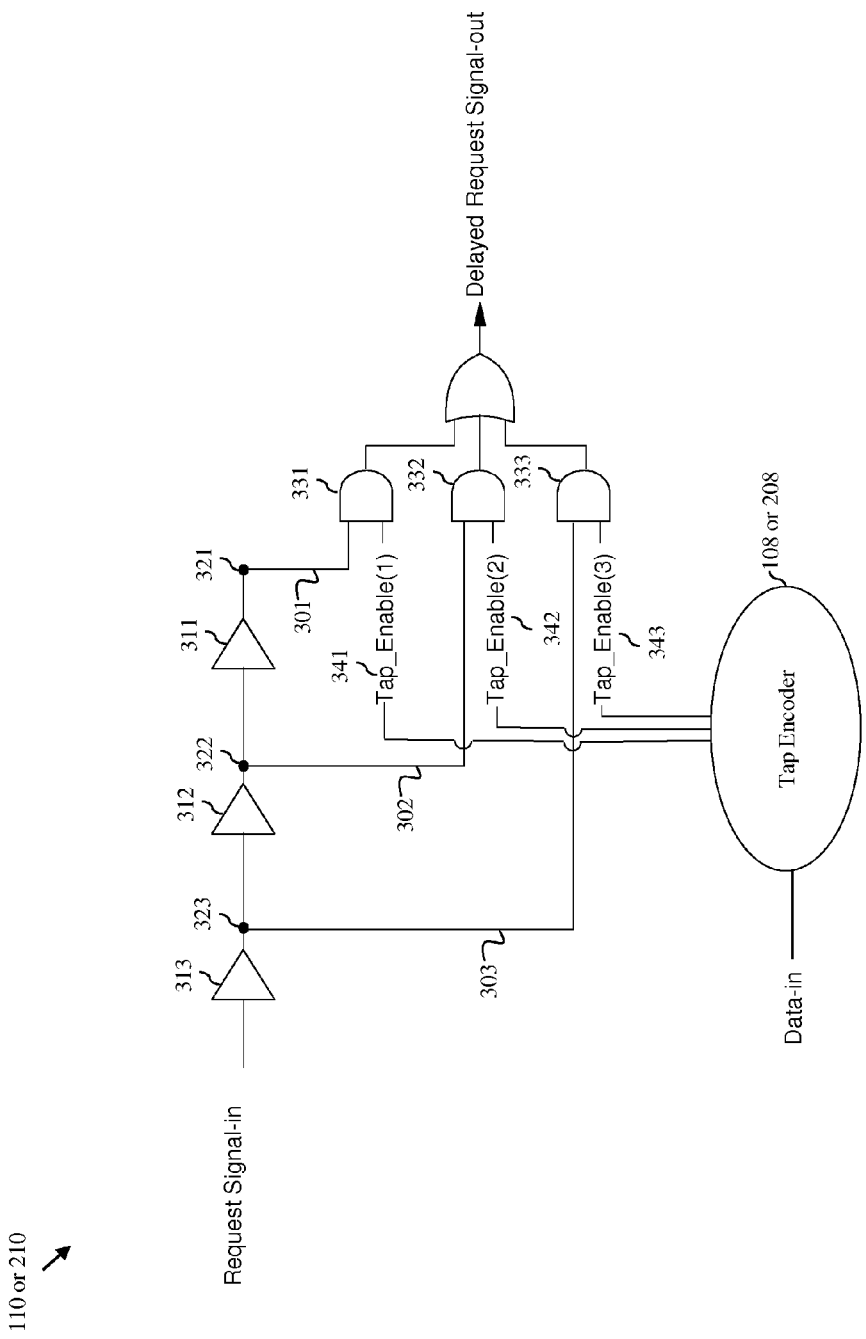
FIG. 2 is a schematic diagram illustrating an exemplary variable delay line that can be incorporated into the circuit of FIG. 1.

FIG. 2 is a schematic drawing illustrating an exemplary variable delay line 110, 210 that can be incorporated into the request signal paths 111, 211 in the various stages 100, 200 of the circuit 10. For illustration purposes, the exemplary variable delay line is described below with respect to incorporation into the first request signal path 111 in order to allow for automatic adjustment of the delay of the first request signal 112. However, it should be understood that a variable delay line with essentially the same structure (with different buffers, as necessary) can be incorporated into the second request signal path 211 in order to allow for automatic adjustment of the delay of the second request signal 212.

Specifically, referring to FIG. 2 in combination with FIG. 1, the first variable delay line 110 can comprise a tapped delay line. This tapped delay line can comprise a plurality of buffers (i.e., buffer amplifiers) 313, 312, 311 connected in series and receiving (i.e., adapted to receive, configured to receive, etc.) the first request signal 112 (see Request Signal-in) from the first controller 101. The tapped delay line can further comprise a plurality of nodes with each node being connected to an output of a corresponding one of the buffers. That is, a node 323 can be connected to the output of the buffer 313, a node 322 can be connected to the output of the buffer 312 and a node 321 can be connected to the output of the buffer 311. Thus, at node 323 the request signal 112 will have been buffered by only buffer 313 so as to have a relatively short delay; at node 322 the request signal 112 will have been buffered by buffers 313 and 312 so as to have a longer delay; and, at node 311 the request signal will have been buffered by buffers 313, 312 and 311 so as to have the longest possible delay. The tapped delay line can further comprise a plurality of taps 303, 302, 301.

Each of the taps 303, 302, 301 can be connected at one end to a corresponding one of the nodes 323, 322 and 321 and at an opposite end to a corresponding logic gate 333, 332, 331 such that the logic gates 333, 332, 331 receive as inputs the delayed signals from the nodes 323, 322, 321, respectively. These logic gates 333, 332, 331 can each also receive as input a tap enable signal 343, 342, 341 from a tap encoder. As discussed in greater detail below and illustrated in FIG. 3, the tap encoder can selectively and automatically assert (i.e., can be adapted to assert, configured to assert, etc.) tap enable signals 343, 342, 341 to the logic gates 333, 332, 331, respectively, in order to selectively and automatically enable the taps 303, 302, 301 and, thereby achieve different request signal delays.

Specifically, if the first tap enable signal 341 is asserted by the tap encoder to the logic gate 331, a first request signal delay can be achieved (i.e., a longest possible request signal delay can be achieved). If the second tap enable signal 342 is asserted by the tap encoder to the logic gate 332, a second request signal delay can be achieved (i.e., a delay which is shorter than the longest possible request signal delay can be achieved). Finally, if the third tap enable signal 343 is asserted by tap encoder to the logic gate 333, a third request signal delay can be achieved (i.e., a delay which is shorter than both the first and second request signal delays). It should be understood that the first request signal delay should be at least equal to the maximum possible processing time that could be required for propagating any data bits in an incoming first set of data bits through the first logic block 106. It should further be understood that, while the variable delay line of FIG. 2 is shown with three taps allowing for three different request signal delays, any appropriate number of two or more taps and corresponding different request signal delays could be used.

As mentioned above, the variable delay line 110 or 210 of FIG. 2 requires a tap encoder 108 or 208 to selectively and automatically assert tap enable signals 343, 342, 341 to the logic gates 333, 332, 331, respectively, in order to selectively and automatically enable the taps 303, 302, 301 and, thereby achieve different request signal delays. Specifically, referring FIG. 1 in combination with FIG. 2, the circuit 10 can further comprise a first tap encoder 108 that can monitor (i.e., can be adapted to monitor, can be configured to monitor, etc.) specific data bits in the first set of data bits 105, as the first set of data bits 105 enters the first logic block 106 (e.g., at node 128), in order to detect any state changes occurring in the specific data bits. This first tap encoder 108 can further automatically enable (i.e., can be adapted to automatically enable, can be configured to automatically enable, etc.) a specific one of the taps 303, 302, 301 corresponding to a specific one of the different request signal delays, based on the results of the monitoring, where such results are indicative of the actual processing time that will be required by the first logic block 106 to completely process the first set of data bits 105. That is, based on which of the specific data bits in the first set 105, if any, exhibited state changes, thereby indicating the amount of processing time required for the first logic block 106, the first tap encoder 108 can assert a specific tap enable signal 343, 342, 341. The specific tap enable signal, once asserted, can achieve a specific request signal delay that will ensure that the transit time for the first request signal 112 along the first request signal path 111 approximates (without being less than) the actual processing time required by the first logic block 106 to completely process the incoming first set of data bits 105.

Similarly, the circuit 10 can further comprise a second tap encoder 208 that can monitor (i.e., can be adapted to monitor, can be configured to monitor, etc.) specific data bits in the second set of data bits 107, as the second set of data bits 107 enters the second logic block 206 (e.g., at node 228), in order to detect any state changes occurring in the specific data bits. This second tap encoder 208 can further automatically enable (i.e., can be adapted to automatically enable, can be configured to automatically enable, etc.) a specific one of the taps 303, 302, 301 corresponding to a specific one of the different request signal delays, based on the results of the monitoring, where such results are indicative of the processing time that will be required by the second logic block 206 to completely process the second set of data bits 107. That is, based on which of the specific data bits in the second set 107, if any, exhibited state changes, thereby indicating the amount of processing time required for the second logic block 206, the second tap encoder 208 can assert a specific tap enable signal 343, 342, 341 and, thereby achieve a specific request signal delay that will ensure that the transit time for the second request signal 212 along the second request signal path 211 approximates (without being less than) the actual processing time required by the second logic block 206 to completely process the incoming second set of data bits 107.

Figure 3:
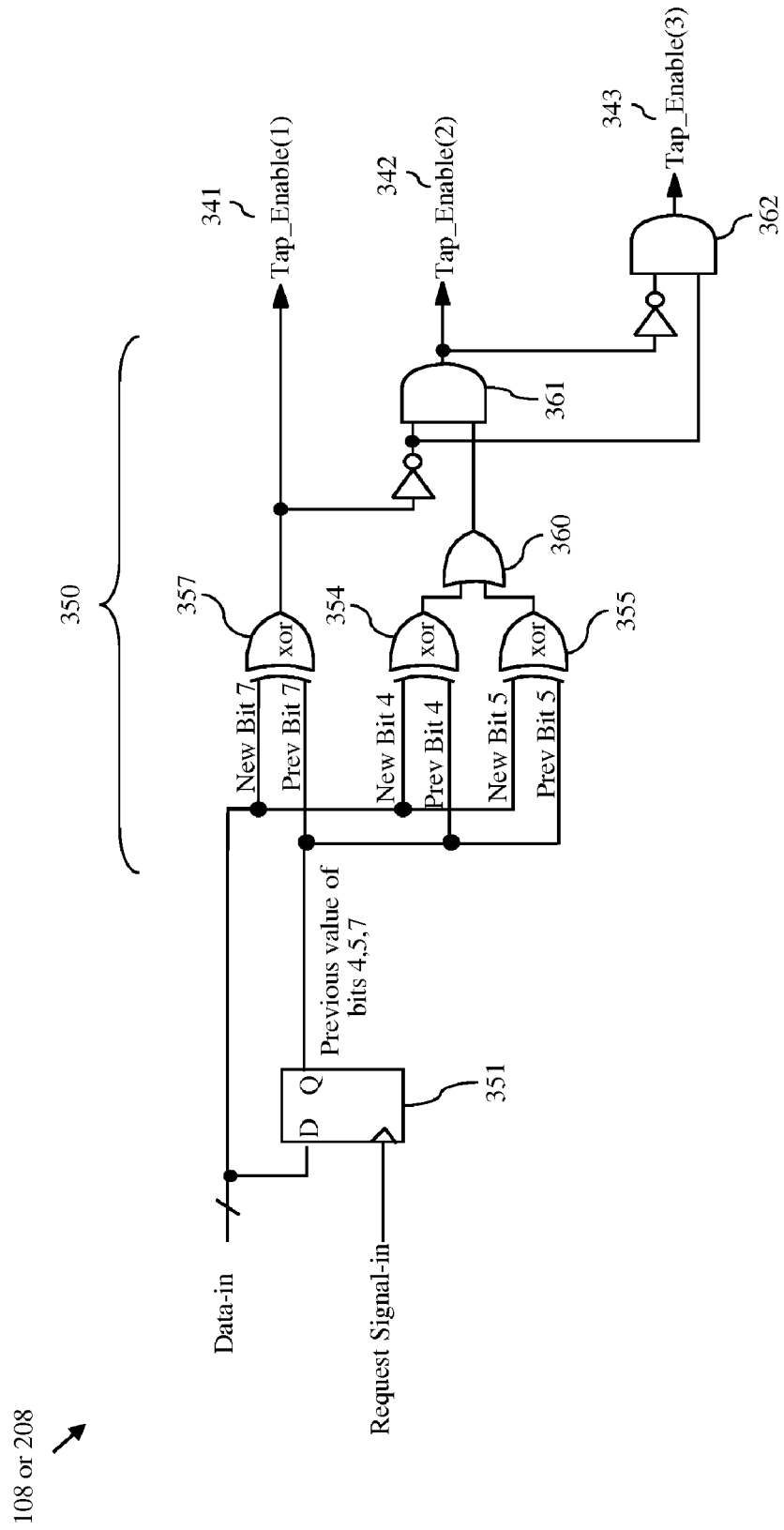
FIG. 3 is a schematic diagram illustrating an exemplary tap encoder that can be incorporated into the circuit of FIG. 1.

FIG. 3 is a schematic drawing illustrating an exemplary tap encoder 108 or 208 that can be incorporated into the various stages 100, 200 of the circuit 10. For illustration purposes, the exemplary tap encoder is described below with respect to incorporation into the first stage 100 for selectively and automatically enabling specific taps in the variable delay line 110 of the first request signal path 111. However, it should be understood that a tap encoder with essentially the same structure can be incorporated into the second stage 200 for enabling a specific tap in the variable delay line 210 of the second request signal path 211.

Specifically, referring to FIG. 3 in combination with FIG. 2, the tap encoder 108 can be adapted to monitor specific data bits (e.g., data bits 7, 4 and 5) in the first set of data bits 105 for state changes and to automatically enable a specific tap in the variable delay line 110 based on which of the specific data bits, if any, exhibited state changes. This is because of a previous determination that a state change occurring in data bit 7 will require the longest possible delay, state changes occurring in data bits 4 or 5 (but not data bit 7) will require a medium delay and state changes occurring in all other data bits (but not data bits 4, 5 or 7) will require only a short delay. To accomplish this, the tap encoder 108 can comprise a data storage device 351 (e.g., a latch). This data storage device 351 can store (e.g., can be adapted to store, configured to store, etc.) the most recent previous states of the specific data bits 7, 4 and 5 in the first set of data bits 105. The tap encoder 108 can further comprise a multiplexor 350 comprising a plurality of XOR gates 357, 354, 355 that, for each of the specific data bits 7, 4 and 5, can compare the previous states to current states in order to detect any state changes. If a state change is detected in data bit 7 by XOR gate 357, a first tap enable signal 341 is automatically asserted in order to enable the first tap 301 and achieve a first request signal delay (i.e., the longest possible delay). The multiplexor 350 can further comprise another XOR gate 360 that can compare the outputs of the XOR gates 354 and 355 and an additional logic gate 361 that can compare the outputs of the XOR gates 357 and 360 so that, if a state change is detected in either of the data bits 4 or 5, but not in data bit 7, a second tap enable signal 342 is automatically asserted in order to enable the second tap 302 and achieve a second request signal delay (i.e., a medium delay). Finally, the multiplexor 350 can comprise another additional logic gate 362 that can compare the outputs of the XOR gate 357 and the additional logic gate 361 so that, if no state changes are detected in data bits 4, 5 or 7, a third tap enable signal 343 is automatically asserted in order to enable the third tap 303 and achieve a third request signal delay (i.e., a short delay). While the exemplary tap encoder of FIG. 3 is configured to output three different tap enable signals corresponding to the three taps in the variable delay line of FIG. 2, it should be understood that, for any tap encoder, the number of tap enablement signals that can be output should correspond the number of taps in the variable delay line.

Figure 4:
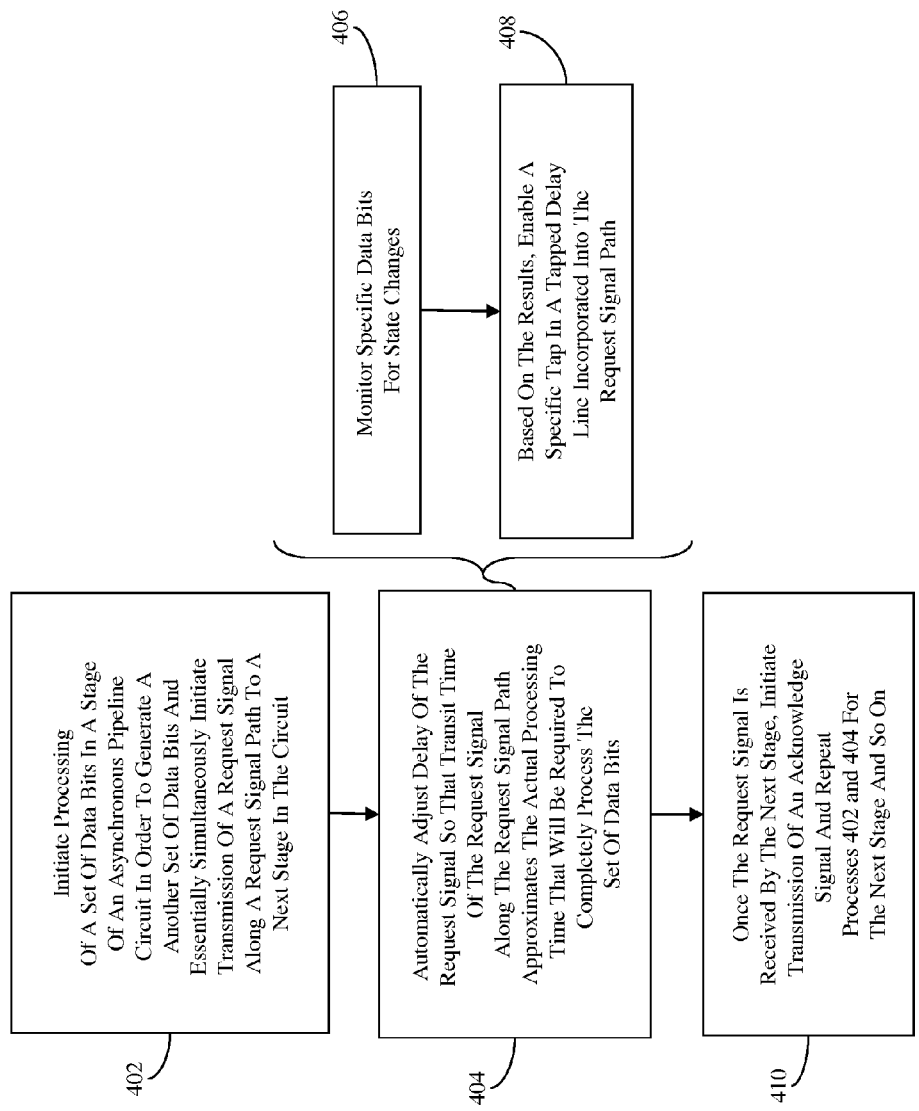
FIG. 4 is a flow diagram illustrating an embodiment of a method for asynchronous pipeline processing with variable request signal delay.

Referring to FIG. 4 in combination with FIG. 1, disclosed herein are embodiments of an associated method for asynchronous pipeline processing with variable request signal delay. The method can comprise initiating processing of a first set of data bits 105 in a first stage 100 of an asynchronous pipeline circuit 10 in order to generate a second set of data bits 107 (402). Specifically, processing of the first set of data bits 105 can be initiated by a first controller 101 that inputs a first latch enable signal 103 into a first latch 104 so as to cause the first latch 104 to output the first set of data bits 105 to a first logic block 106 for processing. Transmission of a first request signal 112 along a first request signal path 111 from the first stage 100 to a second stage 200 of the asynchronous pipeline circuit 10 can be initiated essentially simultaneously (402). However, rather than having a fixed request signal delay equal to or greater than the maximum possible processing time associated with the first stage 101, the delay of the first request signal 112 along a first variable delay line 110 incorporated into the first request signal path 111 can be automatically adjusted so that the transit time for the first request signal 112 along the first request signal path 111 approximates the actual processing time that will be required by the first stage 100 to completely process the first set of data bits 105 into the second set of data bits 107 (i.e., so that the second set of data bits 107 is stable) (404). More specifically, the delay of the first request signal 112 along the first variable delay line 110 can be adjusted at process 404 so that the transit time of the first request signal 112 is as close as possible to, without being less than, the actual processing time required for propagation of the incoming first set of data bits 105 through the first logic block 106, given the available delay values in the first variable delay line 110.

To accomplish this, as discussed in detail above, the first variable delay line 110 can comprise a tapped delay line with a plurality of taps 303, 302, 301 (see FIG. 2). These taps 303, 302, 301 can allow for different request signal delays (e.g., a first delay that is greater than or equal to a maximum possible processing time for propagation of the first set of data bits 105 through the first logic block 106, a second delay that is less than this maximum possible processing time, a third delay that is less than the second delay, etc.) and can be controlled by a corresponding tap encoder 108 (see FIG. 3). With the circuit 10 configured in this manner, the process 404 of adjusting the delay of the first request signal 112 can comprise monitoring (e.g., by the first tap encoder 108) specific data bits from the first set of data bits 105, as the first set of data bits enters the first logic block 106 (e.g., at node 128), in order to detect any state changes occurring in the specific data bits (406). That is, previous states of the specific data bits in the first set of data bits 105 can be compared (e.g., by the first tap encoder 108) to current states of those same specific data bits in order to detect any state changes. Next, based on the results of this monitoring (i.e., based on which of the specific data bits, if any, exhibit stage changes), a specific tap enable signal can be automatically asserted (e.g., also by the first tap encoder 108) (408). Specifically, when the results of the monitoring process are known to be indicative of the actual processing time that will be required by the first logic block 106 to completely process the incoming first set of data bits

105, a specific tap enable signal can be asserted at process 408 in order to enable a specific one of the taps 303, 302, 301 in the tapped delay line and, thereby achieve a specific one of the different request signal delays so that the transit time for the first request signal 112 along the first request signal path 111 is as close as possible to, but not less than, this actual processing time.

Once the first request signal 112 is received by the second stage 200 following the delay, transmission of a first acknowledge signal 120 along a first acknowledge signal path 119 from the second stage 200 back to the first stage 100 can be initiated and, additionally, the same processes 402-408 described above can be repeated for the second stage 200 and so on (410).

Figure 5:
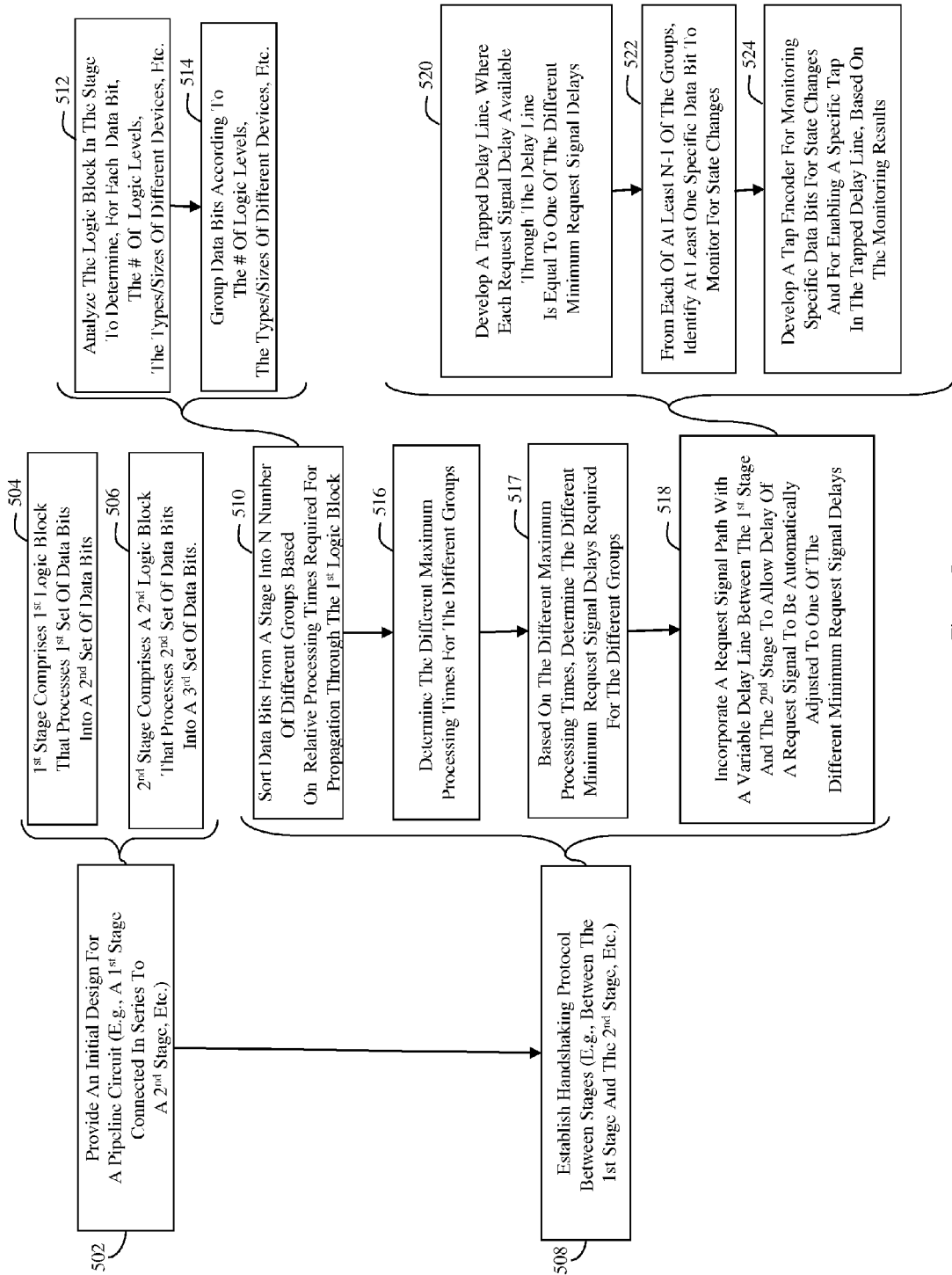
FIG. 5 is a flow diagram illustrating an embodiment of a method for incorporating variable request signal delay into an asynchronous pipeline circuit design.
Figure 6:
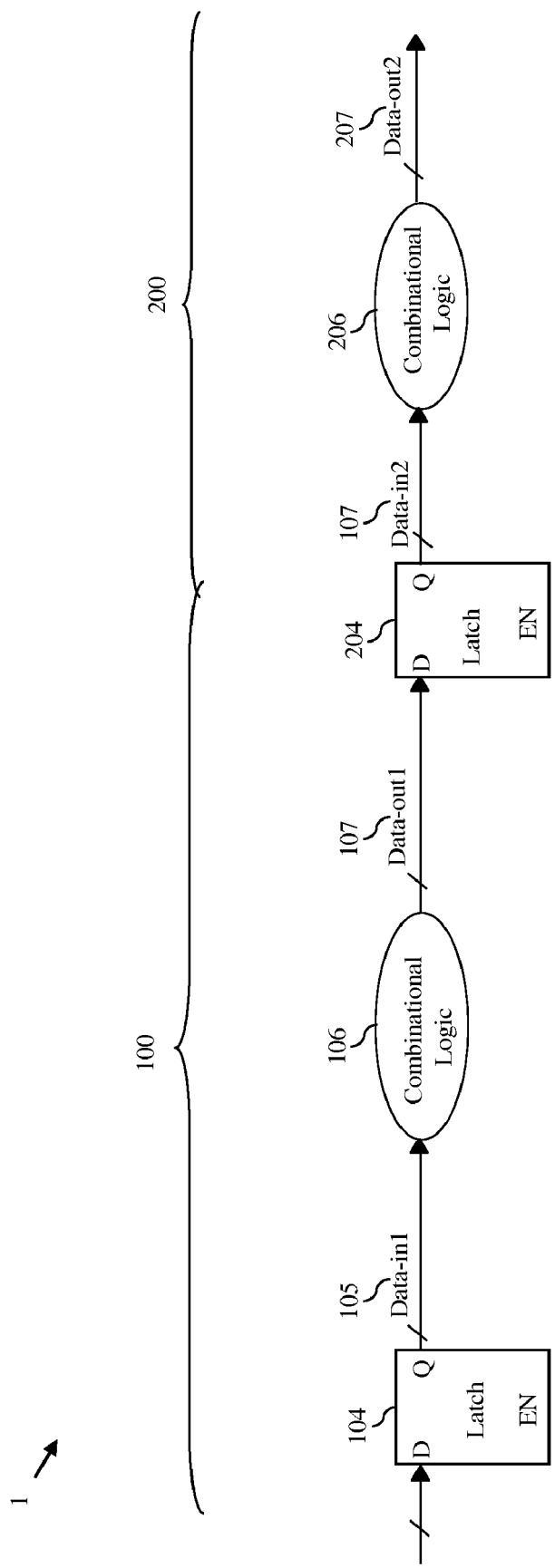
FIG. 6 is a schematic diagram illustrating an exemplary initial design for a pipeline circuit into which variable request signal delay can be incorporated according to the method of FIG. 5.

Referring to FIG. 5, also disclosed herein are embodiments of an associated method for incorporating variable request signal delay into an asynchronous pipeline circuit design. The method can comprise providing an initial design 1 for a pipeline circuit having multiple stages connected in series (502, see FIG. 6). Specifically, in this initial design 1, the pipeline circuit can comprise at least a first stage 100 and a second stage 200 connected in series to the first stage 100. The first stage 100 can comprise a first logic block 106 configured to process a first set of data bits 105 (see Data-in1) in order to generate a second set of data bits 107 (see Data-out1) (504). The second stage 200 can receive the second set of data bits 107 from the first stage 100 (i.e., Data-out1=Data-in2) and can comprise a second logic block 206 configured to process the second set of data bits 107 in order to generate a third set of data bits 207 (see Data-out2) (506). Optionally, a third stage (not shown) can receive the third set of data bits 207 from the second stage 200 and can comprise a third logic block configured to process the third set of data bits and so on.

Next, handshaking protocol with variable request signal delay can be established between the stages in the pipeline circuit (508). As discussed above, in an asynchronous pipeline circuit data is passed from one stage to the next stage using a handshaking protocol, rather clocked registers. That is, a transmitting stage performs its logic function (i.e., propagates data through its logic block) and also asserts a request signal along a request signal path to indicate to a receiving stage (i.e., the next stage in the pipeline) that new data is available for capture. Then, upon receipt of the request signal, the receiving stage captures this new data and asserts an acknowledge signal along an acknowledge signal path back to the transmitting stage to acknowledging receipt.

To establish handshaking protocol with variable request signal delay at process 508 specifically between the first stage 100 and the second stage 200, the data bits in the first set 105 can first be sorted into N number of different groups according to the relative processing times that will be required for propagation of those data bits through the first logic block within the first stage 100 (510). That is, the first logic block 106 in the design can be analyzed in order to determine, for each specific data bit in the first set of data bits 105, the number of levels of logic through which that specific data bit will be propagated in first logic block 106 (512). Alternatively or additionally, the first logic block 106 in the design can be analyzed in order to determine, for each specific data bit in the first set of data bits 105, the different types and/or sizes of devices, such as buffers, through which that specific data bit will be propagated in the first block 106 and/or any other factor which may impact the processing time required for propagation of the specific data bit through the first logic block 106. Then, based on the results of this analysis, the data bits in the first set 105 can be sorted according to the number of levels of logic through which they will be propagated, the different types and/or sizes of devices through which they will be propagated, etc. (514).

Figures 7A, 7B:
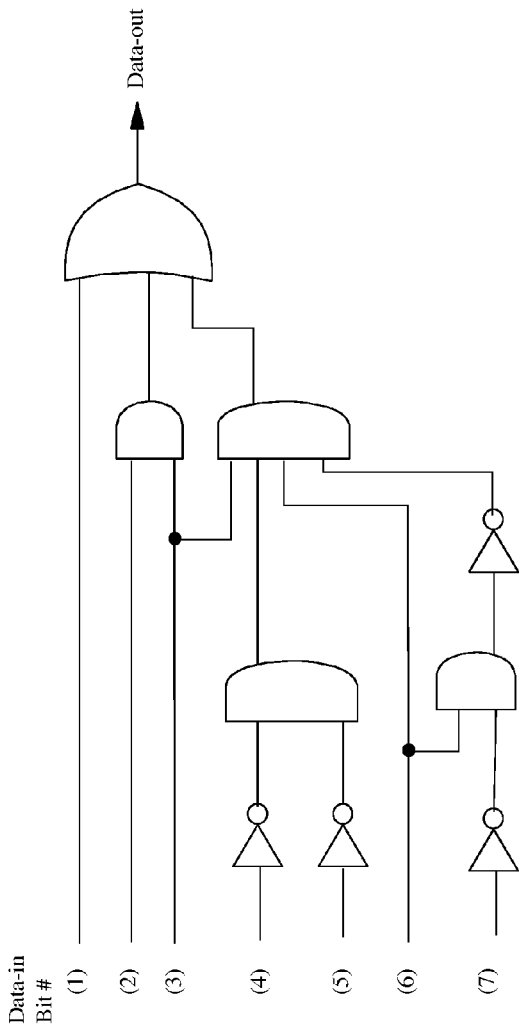
FIG. 7A is a schematic diagram illustrating an exemplary logic block.
FIG. 7B is a table illustrating an exemplary data bits sorting technique.

For example, FIG. 7A illustrates an exemplary logic block that propagates a set of seven data bits (i.e., (1)-(7)). At process 512, this logic block can be analyzed to determine the number of levels of logic associated with each data bit in the set. Then, as shown in the Table of FIG. 7B, these data bits can be sorted at process 514 into three different groups (i.e., groups (a)-(c)), based on the number of levels of logic through which each data bit is propagated. Those skilled in the art will recognize that the number of levels of logic through which each data bits is propagated is indicative of the relative processing time that will be required for data propagation. In this case, group (c) contains data bits which are propagated only through up to three levels of logic (i.e., data bits (1), (2), (3) and (6)). Group (b) contains data bits propagated through four levels of logic (i.e., data bits (4) and (5)). Group (a) contains data bits propagated through five levels of logic (i.e., data bit (7)). Thus, group (a) will require the longest amount of processing time and, thereby the longest request signal delay. Group (b) will require a medium amount of processing time and, thereby a medium request signal delay. Finally, group (c) will require the shortest amount of processing time and, thereby the shortest request signal delay.

Next, timing analyses can be performed in order to determine the different maximum processing times for the different groups (516). That is, for each group of data bits, a timing analysis can be performed to determine the maximum amount of processing time that could be required for propagation of any data bit in that group through the first logic block 106. Then, based on these different maximum processing times, the different minimum request signal delays required for the different groups can be determined (517). That is, for each group, a required minimum request signal delay can be determined in order to ensure that the transit time of a request signal transmitted along a request signal path from the first stage 100 to the second stage 200 will approximate, but not be less than, that maximum amount of processing time required by the first logic block 106 to propagate any of the data bits in that group (as determined at process 516) (see FIG. 7B).

Finally, the method can comprise incorporating a first request signal path 111 into the circuit design between the first stage 100 and the second stage 200 (518, see FIG. 1). This first request signal path 111 can comprise a first variable delay line 110 that allows the delay of a first request signal 112 transmitted along the first request signal path 111 from the first stage 100 to the second stage 200 to be automatically adjusted to any one of the different minimum request signal delays determined at process 517. This process 518 can comprise, for example, first developing the first variable delay line 110 such that it comprises a tapped delay line with a plurality of taps 303, 302, 301, each tap allowing for one of the different minimum request signal delays (520). Next, this process 518 can comprise identifying, from each of at least N−1 of the groups (i.e., from each of all or all but one of the groups), at least one specific data bit to monitor for state changes (522). This process 518 can further comprise developing a first tap encoder 108 for controlling which of the different minimum request signal delays will be applied by the tapped delay line (525). Specifically, a first tap encoder 108 can be developed for monitoring all of the identified specific data bits as the first set of data bits 105 enters the first logic block 106 (e.g., at node 128) in order to detect any state changes occurring in those specific data bits. The tap encoder 108 can further be developed for automatically enabling a specific one of the taps, based on the monitoring results. The specific one of the taps can correspond to a specific one of the different minimum request signal delays, which in turn can correspond to a specific group. Developing a tap encoder in this manner ensures that if a specific data bit from a specific group associated with a medium or long processing time is monitored and exhibits a state change, then the transit time for the request signal transmitted along the request signal path will be at least equal to the maximum processing time for that specific group as determined at process 516. However, developing a tap encoder in this manner also allows the request signal delay to be reduced when the specific data bit(s) from a specific group associated with a relatively long processing time are monitored and do not exhibit state changes.

For example, referring to FIGS. 7A-7B, data bit (7) can be identified at process 522 as the representative specific data bit from group (a). Due to the configuration of the logic block, a state change occurring in data bit (7) will require the longest amount of processing time and, thereby the longest request signal delay. Additionally, data bits (4) and (5) can be identified at process 522 as the representative specific data bits from group (b). Due to the configuration of the logic block, state changes occurring in either data bit (4) or (5), but not in data bit (7), will require a medium amount of processing time and, thereby a medium request signal delay. Specific data bits representative of group (c) do not need to be identified because as long as state changes do not occur in data bit (7) from group (a) or in data bits (4) or (5) from group (b), only a relatively short amount of processing time will be required and, thereby only a relatively short request signal delay. Thus, a tap encoder 108, such as that shown in FIG. 3 and described in detail above, can be developed at process 524 for use in conjunction with the tapped delay line of FIG. 2 in order to monitor data bits (7), (4) and (5) for state changes and enable the appropriate taps in the delay line, as necessary. That is, the tap encoder 108 can be developed so that if data bit (7) exhibits a state change, then the tap enable signal 341 will be asserted in order to automatically enable tap 301 and, thereby achieve the longest possible request signal delay. The tap encoder 108 can further be developed so that if either data bit (4) or (5) exhibits a state change, but not in data bit (7), then tap enable signal 342 will be asserted in order to automatically enable tap 302 and, thereby achieve a medium request signal delay. Finally, the tap encoder 108 can further be developed so that if state changes are not detected in data bits (4), (5) or (7), then the tap enable signal 343 will be asserted in order to automatically enable tap 301 and, thereby achieve the shortest possible request signal delay.

Similar process steps can be used for establishing the handshaking protocol between the other stages in the pipeline circuit (e.g., between the second stage 200 and a third stage 300, and so on).

It should be understood that the terminology used herein is for the purpose of describing particular embodiments only and is not intended to be limiting of the invention. As used herein, the singular forms "a", "an" and "the" are intended to include the plural forms as well, unless the context clearly indicates otherwise. It should further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Additionally, the corresponding structures, materials, acts, and equivalents of all means or step plus function elements in the claims below are intended to include any structure, material, or act for performing the function in combination with other claimed elements as specifically claimed. Finally, it should be understood that the description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described were chosen in order to best explain the principles of the invention and the practical application, and to enable others of ordinary skill in the art to understand the invention for various embodiments with various modifications as are suited to the particular use contemplated.

Therefore, disclosed above are embodiments of an asynchronous pipeline circuit with variable request signal delay. Specifically, in each stage of the pipeline circuit, a variable delay line with a plurality of taps is incorporated into the request signal path. A tap encoder monitors data entering the stage to detect any state changes occurring in specific data bits. Based on the monitoring results (i.e., based on which of the specific data bits, if any, exhibit state changes), the tap encoder enables a specific tap within the variable delay line and, thereby automatically adjusts the delay of a request signal transmitted along the request signal path. In other words, the request signal delay is adjusted on-the-fly based on actual data values entering the stage and, hence, on which cones of logic will be active. Using a variable request signal delay, as opposed to a fixed request signal delay, allows data from a transmitting stage to be captured by a receiving stage prior to the expiration of the maximum possible processing time associated with the logic block of the transmitting stage. Consequently, the disclosed asynchronous pipeline circuit minimizes the amount of time during which pipeline stages sit idle (e.g., waiting for a request signal delay to expire) and, thereby decreases overall pipeline processing time. Also disclosed are embodiments of methods for asynchronous pipeline processing with variable request signal delay and also for incorporating variable request signal delay into an asynchronous pipeline circuit.

What is claimed is:

1. An asynchronous pipeline circuit with variable request signal delay, said circuit comprising:
   a first stage processing a first set of data bits to generate a second set of data bits;
   a second stage connected in series to said first stage; and
   a request signal path transmitting a request signal from said first stage to said second stage as said first set of data bits is being processed,
   said second stage initiating processing of said second set of data bits upon receipt of said request signal, and
   said request signal path comprising a variable delay line that automatically and selectively applies one of a plurality of different request signal delays to said request signal so as to allow delay of said request signal along said request signal path, said one of said plurality of different request signal delays being automatically and selectively applied so that the transit time for said request signal along said request signal path approximates the actual processing time required by said first stage to completely process said first set of data bits.

2. The circuit of claim 1,
   said first stage comprising:
   a first latch storing said first set of data bits;
   a first logic block; and
   a first controller inputting a first enable signal into said first latch, said first enable signal causing said first latch to output said first set of data bits to said first logic block for processing and said first controller further essentially simultaneously initiating transmission of said request signal along said request signal path; and said second stage comprising:
- a second latch receiving said second set of data bits from said first logic block and storing said second set of data bits;
- a second logic block; and
- a second controller receiving said request signal from said request signal path and, in response to said request signal, inputting a second enable signal into said second latch, said second enable signal causing said second latch to output said second set of data bits to said second logic block for processing.

3. The circuit of claim 2,
said variable delay line comprising a tapped delay line comprising a plurality of taps allowing for said different request signal delays, and
said circuit further comprising a tap encoder monitoring specific data bits in said first set of data bits as said first set of data bits enter said first logic block in order to detect any state changes occurring in said specific data bits and further, based on the results of said monitoring, automatically enabling a specific one of said tap corresponding to a specific one of said different request signal delays, said results being indicative of said processing time required by said first stage to completely process said first set of data bits.

4. The circuit of claim 3, said specific one of said different request signal delays being a request signal delay that ensures that said transit time for said request signal along said request signal path is as close as possible to said processing time without being less than said processing time.

5. The circuit of claim 3, said different request signal delays comprising at least:
- a first delay that is greater than or equal to a maximum possible processing time for propagation of data bits through said first logic block; and
- a second delay that is less than said maximum possible processing time.

6. The circuit of claim 3, said tapped delay line further comprising:
- a plurality of buffers connected in series with a first one of said buffers receiving said request signal from said first controller; and
- a plurality of nodes,
  - each node being connected to an output of a corresponding one of said buffers,
  - each tap comprising a logic gate that is connected in series between a corresponding one of said nodes and said second controller, and
  - each logic gate further being connected to said tap encoder such that said tap encoder can automatically enable any one of said taps.

7. The circuit of claim 3, said tap encoder comprising a data storage device storing previous states of said specific data bits in said first set of data bits and a plurality of XOR logic gates comparing said previous states to current states of said specific data bits in order to detect said any state changes.

8. The circuit of claim 1, further comprising an acknowledge signal path transmitting an acknowledge signal from said second stage to said first stage.

9. A method for asynchronous pipeline processing with variable request signal delay, said method comprising:
initiating processing of a first set of data bits by a first stage of an asynchronous pipeline circuit to generate a second set of data bits;

essentially simultaneously initiating transmission of a request signal along a request signal path from said first stage to a second stage of said asynchronous pipeline circuit;

automatically and selectively applying, by a variable delay line incorporated into said request signal path, one of a plurality of different request signal delays to said request signal so as to allow delay of said request signal along said request signal path, said one of said plurality of different request signal delays being automatically and selectively applied so that the transit time for said request signal along said request signal path approximates the actual processing time required by said first stage to completely process said first set of data bits; and upon receipt of said request signal by said second stage, initiating processing of said second set of data bits by said second stage.

10. The method of claim 9,
said initiating of said processing of said first set of data bits comprising inputting, by a first controller, a first enable signal into a first latch, said first enable signal causing said first latch to output said first set of data bits to a first logic block for processing, and
said initiating of said processing of said second set of data bits comprising inputting, by a second controller, a second enable signal into a second latch, said second enable signal causing said second latch to output said second set of data bits to a second logic block for processing.

11. The method of claim 10, said variable delay line comprising a tapped delay line comprising a plurality of taps allowing for said different request signal delays, and said method further comprising:
monitoring specific data bits in said first set of data bits as said first set of data bits enters said first logic block in order to detect any state changes occurring in said specific data bits; and
based on the results of said monitoring, automatically enabling a specific one of said taps corresponding to a specific one of said different request signal delays, said results being indicative of said processing time required by said first stage to completely process said first set of data bits.

12. The method of claim 11, said specific one of said different request signal delays being a request signal delay that ensures that said transit time for said request signal along said request signal path is as close as possible to said processing time without being less than said processing time.

13. The method of claim 11, said different request signal delays comprising at least:
- a first delay that is greater than or equal to a maximum possible processing time for propagation of data bits through said first logic block; and
- a second delay that is less than said maximum possible processing time.

14. The method of claim 11, said monitoring of said specific data bits comprising comparing previous states of said specific data bits in said first set of data bits to current states of said specific data bits in said first set of data bits.

15. The method of claim 9, further comprising upon receipt of said request signal by said second stage, initiating transmission of an acknowledge signal along an acknowledge signal path from said second stage to said first stage.

16. A method for incorporating variable request signal delay into an asynchronous pipeline circuit design, said method comprising:
providing a design for a pipeline circuit, said design comprising at least a first stage and a second stage connected in series to said first stage, said first stage being configured to process a first set of data bits to generate a second set of data bits and said second stage being configured to receive and process said second set of data bits; and establishing a handshaking protocol between said first stage and said second stage, said establishing of said handshaking protocol comprising:

sorting said data bits in said first set into N number of different groups according to relative processing times required for propagation of said data bits through a logic block within said first stage;

determining different maximum processing times for said different groups;

based on said maximum processing times, determining different minimum request signal delays required for said different groups; and incorporating a request signal path between said first stage and said second stage, said request signal path comprising a variable delay line that automatically and selectively applies one of said different minimum request signal delays to said request signal so as to allow delay of a request signal transmitted along said request signal path from said first stage to said second stage, said one of said different minimum request signal delays being automatically and selectively applied so that the transit time for said request signal along said signal path approximates the actual processing time required by said first state to completely process said first set of data bits.

17. The method of claim 16,
said establishing of said handshaking protocol further comprising analyzing said logic block in order to determine, for each data bit in said first set of data bits, the number of levels of logic through which said data bit can be propagated, and
said sorting being based on said number of levels of logic.

18. The method of claim 16,
said establishing of said handshaking protocol further comprising analyzing said logic block in order to determine, for each data bit in said first set of data bits, the number of levels of logic and the different devices through which said data bit can be propagated, and
said sorting being based on said number of levels of logic and said different devices.

19. The method of claim 16, said incorporating of said request signal path further comprising:

developing said variable delay line such that said variable delay line comprises a tapped delay line comprising a plurality of taps allowing for each of said different minimum request signal delays;

from each of at least N−1 of said different groups, identifying at least one specific data bit to monitor for state changes; and developing a tap encoder for monitoring all identified specific data bits for said state changes as said first set of data bits enters said logic block in and further for automatically enabling, based on the results of said monitoring, a specific one of said taps corresponding to a specific one of said different minimum request signal delays.

20. The method of claim 19, said developing of said tap encoder ensure that if a specific data bit from a specific group is monitored and exhibits a state change, then a transit time for said request signal transmitted along said request signal path will be at least equal to a maximum processing time determined for said specific group.

* * * * *